United States Patent [19]

Billet et al.

[11] Patent Number: 4,650,051
[45] Date of Patent: Mar. 17, 1987

[54] CLUTCH WITH REACTION PLATE IN TWO PARTS, ESPECIALLY FOR MOTOR VEHICLES

[75] Inventors: René Billet, Lamorlaye; Michel Bacher, Garges les Gonesse, both of France

[73] Assignee: Valeo, Paris, France

[21] Appl. No.: 489,531

[22] Filed: Apr. 28, 1983

[30] Foreign Application Priority Data

Apr. 29, 1982 [FR] France ............... 82 07391

[51] Int. Cl.[6] .................................. F16D 13/72
[52] U.S. Cl. .................. 192/70.12; 192/89 B; 192/113 A
[58] Field of Search ............ 192/70.12, 70.13, 70.18, 192/70.28, 89 B, 107 R, 109 A, 113 A; 123/406

[56] References Cited

U.S. PATENT DOCUMENTS

| | | | |
|---|---|---|---|
| 715,111 | 12/1902 | Miller | 192/113 A |
| 2,100,464 | 9/1936 | Almen et al. | 192/70.12 |
| 2,244,169 | 6/1941 | Miller | 192/70.28 |
| 2,785,781 | 3/1957 | Johansen | 192/113 A |
| 3,151,717 | 10/1964 | Kaptur et al. | 192/89 B |
| 3,468,402 | 9/1969 | Edwards | 192/113 A |
| 3,507,375 | 4/1970 | Ryland | 192/113 A |
| 3,583,537 | 6/1971 | Spannagel | 192/70.12 |
| 3,770,088 | 11/1973 | Shono | 192/89 B |
| 4,210,233 | 7/1980 | Courbot | 192/89 B |
| 4,257,509 | 3/1981 | Hiraiwa et al. | 192/109 A |
| 4,493,409 | 1/1985 | Steeg | 192/70.13 |

FOREIGN PATENT DOCUMENTS

| | | |
|---|---|---|
| 0022071 | 1/1981 | European Pat. Off. . |
| 2853298 | 6/1980 | Fed. Rep. of Germany . |
| 1110406 | 2/1956 | France . |
| 1422552 | 11/1965 | France . |
| 890600 | 3/1967 | France . |
| 2278014 | 2/1976 | France . |
| 2365036 | 4/1978 | France . |
| 545538 | 6/1942 | United Kingdom . |
| 1090622 | 11/1967 | United Kingdom . |
| 1121320 | 7/1968 | United Kingdom . |
| 1196849 | 7/1970 | United Kingdom . |
| 1361649 | 7/1974 | United Kingdom . |
| 1416552 | 12/1975 | United Kingdom . |
| 2010422 | 6/1979 | United Kingdom . |

Primary Examiner—Rodney H. Bonck
Assistant Examiner—Alan G. Towner
Attorney, Agent, or Firm—Charles E. Brown; Charles A. Brown

[57] ABSTRACT

A clutch for a motor vehicle is provided in which the reaction plate assembly is made of two separate parts fixed to one another by fastening means, namely a transverse supporting bracket, by means of which it can be fixed to the input shaft, and a reaction element with which the associated friction disc can interact. The reaction plate element and the supporting bracket bear axially on one another by means of local seats providing circumferentially between them recesses which open freely outwards radially, the cover being fixed to the said reaction plate element. This arrangement provides good ventilation in the space between the supporting bracket and the reaction plate element. Furthermore the components between which the friction disc is interposed have similar thermal characteristics and this is favorable to balanced working conditions of the said friction disc on the respective faces.

7 Claims, 8 Drawing Figures

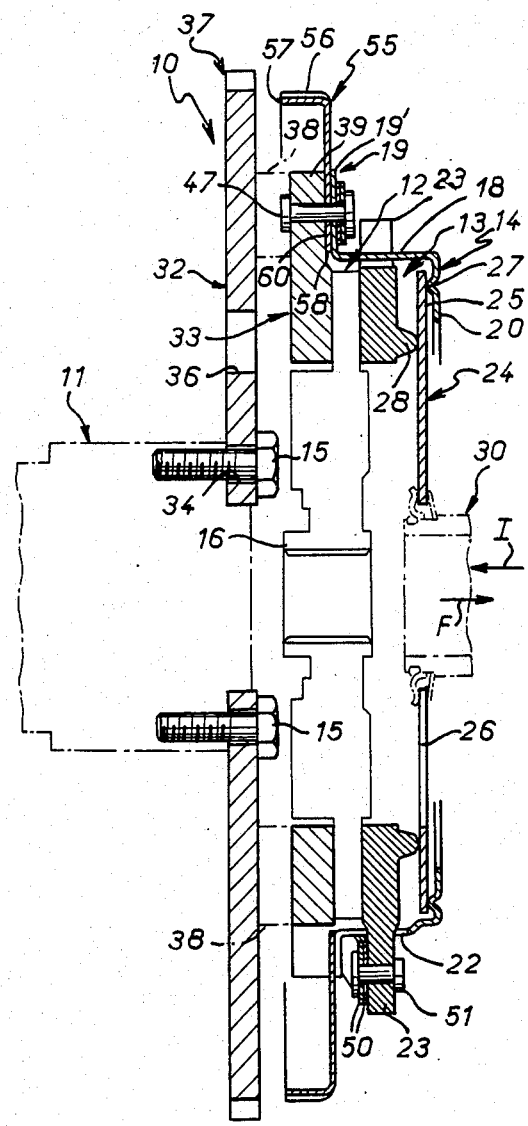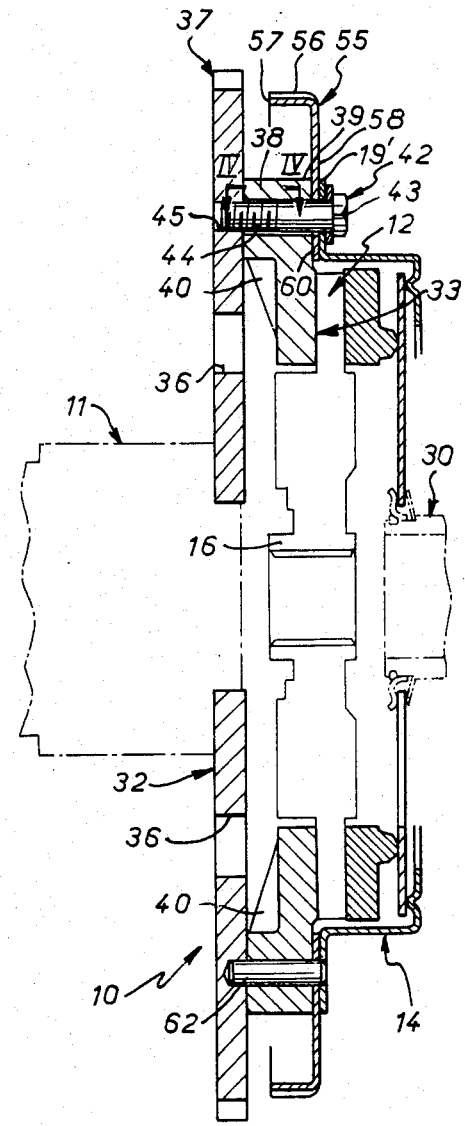

CLUTCH WITH REACTION PLATE IN TWO PARTS, ESPECIALLY FOR MOTOR VEHICLES

BACKGROUND OF THE INVENTION

The present invention relates, in general terms, to clutches of the kind conventionally used for equipping motor vehicles.

As is known, such a clutch substantially comprises at least, axially in succession, a first plate, commonly called a reaction plate or flywheel, intended to be fixed in rotation to a first shaft, in practice a drive shaft such as the output shaft of the engine in the case of a motor vehicle, a friction disc intended to be fixed in rotation to a second shaft, in practice a driven shaft such as the input shaft of a gearbox in the case of a motor vehicle, a second plate, commonly called a pressure plate, fixed in rotation to the reaction plate, whilst being movable axially in relation to the latter, a component, called a cover, which is fixed by a fastening means to the reaction plate beyond the periphery of the pressure plate and the friction disc, and elastic means which, bearing on the cover, are designed to stress the pressure plate towards the reaction plate so as to clamp the friction disc axially between the said plates.

Apart from the fact that it makes it possible to attach the assembly to the shaft in question, in practice the reaction plate must perform several functions.

First of all, because of its mass it constitutes an inertial flywheel suitable for regulating the acyclic rotation of the shaft in question.

It must therefore have a mass sufficient for this purpose.

Furthermore, it is responsible for ensuring, at least to a certain extent, absorption and dissipation of the heat energy released as a result of friction when it comes in contact with the friction disc during engagement or disengagement of the clutch.

As above, it must have a mass sufficient for this purpose.

Moreover, since this is a clutch for a motor vehicle, it conventionally carries a starter ring.

It must therefore have a diametral extension sufficient to meet the requirements for installing the pinion intended to interact with this starter ring.

Likewise, when, as is also the case in some motor vehicles, the clutch is equipped with an ignition target, it must also have a diametral extension sufficient to meet the requirements for installing the sensor intended to interact with this ignition target.

The reaction plate is usually made in one piece, for example by moulding any material, such as cast iron or steel.

Because of the above-mentioned requirements of diametral extension, this component often has a substantial mass which is largely redundant as regards the sole parallel requirements of inertia and absorption of heat energy.

Such a component is therefore needlessly expensive and heavy.

Moreover, since its mass is redundant as regards the heat absorption requirement, it causes premature asymmetry in the heat exchanges which the friction disc undergoes, the pressure plate normally not having by itself a mass with an equivalent capacity for the absorption of heat energy.

The result of this can be, in particular, an unnecessary difference in the wear which the friction linings of this friction disc undergo on the respective faces.

To mitigate these disadvantages, in particular German Patent Application No. 2,853,298 has proposed making the reaction plate of an assembly of two separate parts, namely a transverse supporting bracket, by means of which the said reaction plate assembly can be fixed to the shaft in question, and a reaction element with which the friction disc can interact.

It would thus be possible to match both of these parts as closely as possible to the functions which they have to perform, and this would make it possible, in particular, in a substantially cheaper and lighter assembly, to assist in ensuring a symmetry of the heat exchanges which the friction disc undergoes on the respective faces.

However, in German Patent Application No. 2,853,298, the fastening means fixing the two parts forming the reaction plate assembly to one another are separate from those fixing the cover to this reaction plate assembly.

This results in a multiplicity of fastening means to be used, which is detrimental to the sought-after saving and lighter weight.

Furthermore, in German Patent Application No. 2,853,298, the cover is fastened to the supporting bracket of the reaction plate assembly, and, since it therefore extends annularly beyond the reaction element it necessarily has a considerable size in the axial and diametrial directions, again detrimental to the sought-after saving and lighter weight.

Finally, although in this German Patent Application No. 2,853,298 the reaction element bears on the supporting bracket, with which it is associated, only by means of local seats which form recesses circumferentially between them, most of these are masked by the cover which bears circumferentially by means of a radial edge on the said supporting bracket, with the exception of some notches of limited extension made in the said edge and the corresponding side wall, and which are provided to allow free play to the fastening means fixing the reaction element to the said supporting bracket and to attach the reaction element to the said cover.

The result of this is that the internal space contained between the supporting bracket and the reaction element, and consequently the corresponding face of the latter, are not ventilated in a satisfactory manner.

The same is true in French Pat. No. 1,110,406, in which the fastening means fixing the reaction plate assembly to the cover also fix the two parts forming the reaction plate assembly to one another, with one of these parts bearing circularly on the other.

The subject of the present invention is, in general terms, an arrangement which, avoiding these disadvantages, makes it possible to gain more benefit from making the reaction plate assembly in two separate parts, in particular ensuring good ventilation of its internal space.

SUMMARY

More precisely, the invention provides a clutch, especially for a motor vehicle, comprising axially in succession, a reaction plate assembly intended to be fixed in rotation to a first shaft, a friction disc intended to be fixed in rotation to a second shaft, a pressure plate, fixed in rotation to the reaction plate assembly, whilst being movable axially in relation thereto, a cover, which is fixed by fastening means to the reaction plate assembly, and elastic means which, bearing on the cover, is arranged to stress the pressure plate towards the reaction plate assembly so as to clamp the friction disc axially between the pressure plate and the reaction plate assembly, the said reaction plate assembly being made of two separate parts fixed to one another by fastening means, said parts comprising a transverse supporting bracket, by means of which the reaction plate assembly can be fixed to the shaft in question, and a reaction element with which the friction disc can interact, and wherein the cover is fixed to the reaction element and the said reaction element and the supporting bracket with which it is associated bear axially on one another only by means of local seats, in such a way that the recesses left free circumferentially between the said seats, between the reaction element supporting bracket, open freely outwards radially.

Thus, good ventilation of the internal space is ensured, since the latter communicates very widely with the outside via the recesses left free between the pressure plate and the reaction element.

Moreover, since the cover is fastened to the reaction element, its size in the axial and diametrial directions is reduced, as are consequently also its cost and its weight.

According to one preferred feature of the invention, when the clutch also incorporates an ignition target, the said ignition target can advantageously form a separate component secured to the clutch by the fastening means fixing the cover to the reaction plate assembly.

It thereby becomes easier to produce this ignition target, without the need to use specific fastening means to fix it to the clutch.

Likewise, when the clutch incorporates a starter ring, as is customary, the latter can, according to another preferred feature of the invention, advantageously form, if desired, a separate component secured to the clutch by the fastening means fixing the cover to the reaction plate assembly.

As above, this starter ring can thereby be produced more easily, without the need to use specific fastening means to fix it to the clutch.

Finally, according to another preferred feature of invention, the reaction element forms a component identical to that formed in parallel by the pressure plate.

The production cost of the assembly is thus reduced, since one and the same production operation is suitable both for the pressure plate and for one of the components constituting the reaction plate assembly.

Furthermore, in such a case, the components between which the friction disc is interposed, namely the pressure plate and the reaction element advantageously have similar thermal inertias, and this is favourable to balanced working conditions of the said friction disc on the respective faces.

BRIEF DESCRIPTION OF THE DRAWINGS

FIGS. 2 and 3 are views of this in axial sections respectively along the broken lines II—II and III—III in FIG. 1;

DESCRIPTION OF THE PREFERRED EMBODIMENTS

Figure 1:
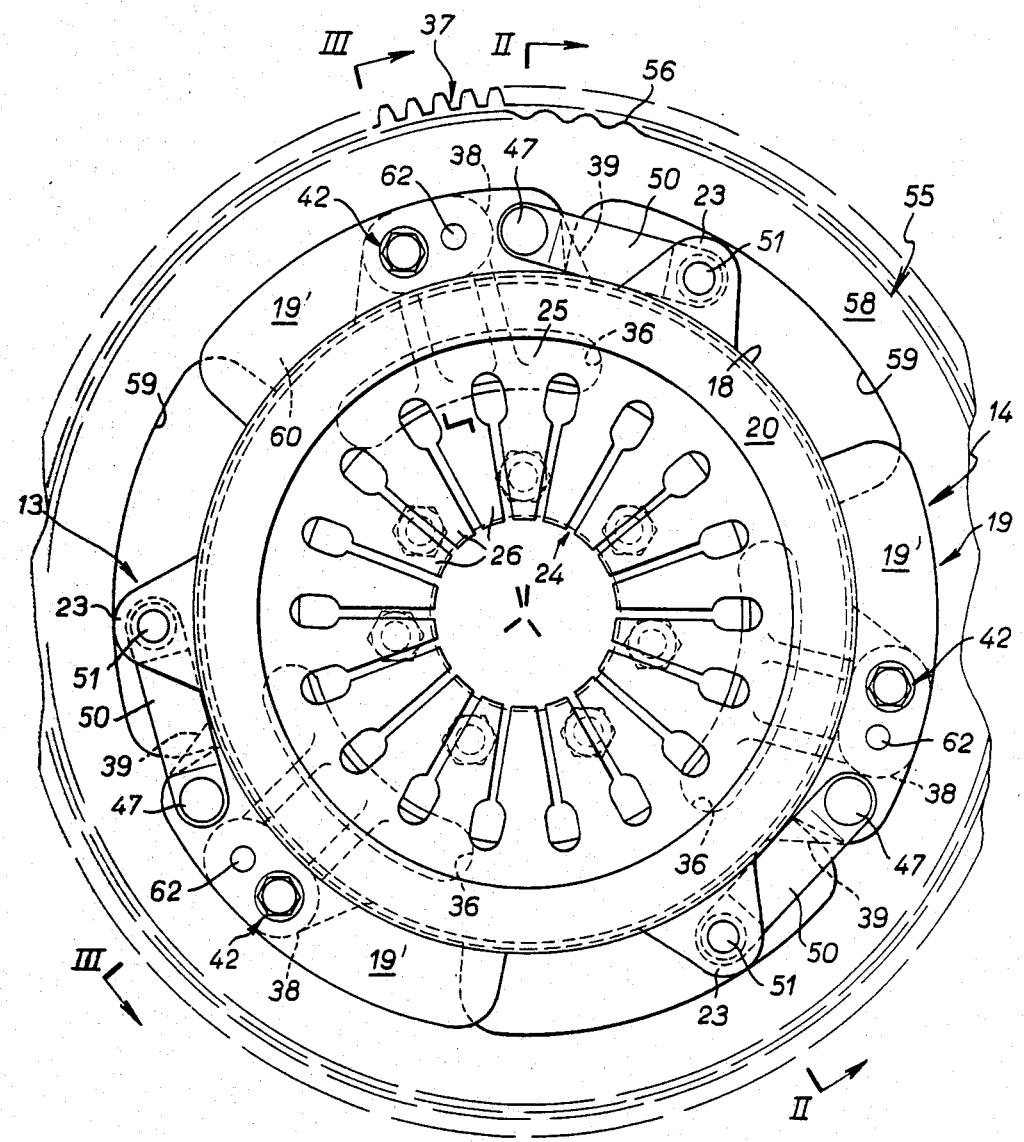
FIG. 1 is a partial plan view of a clutch according to the invention as viewed along arrow I in FIG. 2.
Figure 4:
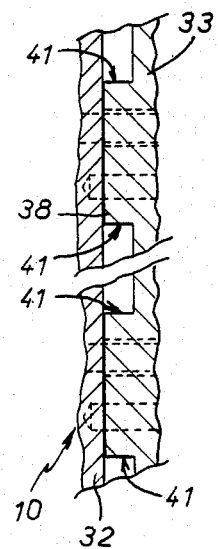
FIG. 4 is a partial view, assumed to be laid out flat, of a circumferential section along the line IV—IV in FIG. 3.

Substantially, and as illustrated in these Figures, a clutch comprises at least, axially in succession and in a way known per se, a first plate 10, commonly called a reaction plate or flywheel, intended to be fixed in rotation to a first shaft 11 indicated by dot-and-dash lines in FIGS. 2 to 6, a friction disc 12 intended to be fixed in rotation to a second shaft, not shown in the Figures, a second plate 13, called a pressure plate, fixed in rotation to the reaction plate 10, whilst being movable axially in relation to the latter, a component 14, called a cover, fixed in rotation to the reaction plate 10 and connected axially to the latter, and elastic means which, bearing on the cover 14, are designed to stress the pressure plate 13 towards the reaction plate 10 so as to clamp the friction disc 12 axially between the said pressure plate 13 and the reaction plate 10.

In practice, the shaft 11 is a drive shaft.

Since a clutch for a motor vehicle is concerned here, this is the crankshaft of the engine of the vehicle.

In the embodiment illustrated in FIGS. 1 to 3, the reaction plate assembly 10 is secured to the shaft 11 by a plurality of screws 15 appropriately distributed circularly round the axis of the assembly.

In conjunction with this, the shaft to which the friction disc 12 is to be fixed in rotation by means of its hub 16 is, in practice, a driven shaft.

Since a clutch for a motor vehicle is concerned here, this is, for example, the input shaft of the gearbox with which such a motor vehicle is conventionally equipped.

The friction disc 12 has been indicated merely by its contour shown in thin lines in the Figures.

Such a friction disc is well known per se, and will not be described in any more detail here.

The cover 14 is, in a manner known per se, a component of substantially annular configuration which has, at the axial ends of a substantially cylindrical or frustoconical side wall 18, on the one hand, directed radially outwards, a radial edge 19 by means of which it is secured to the reaction plate assembly 10 according to the methods described in more detail below, and on the other hand, directed radially inwards, a collar 20 by means of which it presents a support to the elastic means, also described in more detail below, which stress the pressure plate 13 towards the reaction plate assembly 10.

In the embodiment illustrated in FIGS. 1 to 3, the radial edge 19 of the cover 14, formed in this way, is substantially divided circularly into a plurality of separate portions 19' which are uniformly distributed circularly and of which there are three in this embodiment.

Furthermore, from one of these portions 19' of the edge 19 to another, the side wall 18 of the cover 14 is amply recessed over a major part of its axial length by notches 22.

In a manner also known per se, the pressure plate 13 is a component of substantially annular configuration.

It has, at certain points, lugs 23 extending radially outwards, of which there are three in the embodiment illustrated in FIGS. 1 to 3, and which pass radially through the side wall 18 of the cover 14 via the notches 22 in the latter.

In the embodiment illustrated in FIGS. 1 to 3, the elastic means to which this pressure plate 13 is subjected consists likewise of a component of substantially annular configuration 24, called a diaphragm, which has a peripheral part forming a cup spring 25 and a central part fragmented into radial fingers 26.

By means of its peripheral part forming a cup spring 25, the diaphragm 24 bears on the cover 14 by means of an annular boss 27 projecting axially for this purpose on the radial collar 20 of the latter, and it bears on the pressure plate 13 by means of an annular bead 28 which is, preferably, fragmented circularly and likewise projects axially for this purpose on the latter.

Via the ends of its radial fingers 26, the diaphragm 24 can be subjected to a clutch release bearing 30 indicated by dot-and-dash lines in FIGS. 2, 3, 5, 6 and 8.

In the embodiments illustrated this bearing is a clutch release bearing which is designed to act by pulling, that is to say in the direction away from the reaction plate assembly 10, as indicated by the arrow F in FIG. 2.

Consequently, the diameter of the circumference along which extends the bead 27 which the cover 14 possesses for supporting the diaphragm 24 is greater than that of the circumference along which extends the bead 28 which the pressure plate 13 possesses for the action of this diaphragm 24.

The reaction plate assembly 10 is itself a component of substantially annular configuration and is made, in a manner known per se, of two separate parts fixed to one another by fastening means described in more detail below, and comprises a transverse supporting bracket 32, which can be fixed to the shaft 11 by the screws 15, and a reaction element 33 with which the friction disc 12 can interact.

In the embodiment illustrated in FIGS. 1 to 3, the supporting bracket 32 is a steel component produced, for example, by pressing and has substantially the form of an annular plate flat on both of its faces.

In addition to holes 34 which it has in places in the vicinity of its inner periphery, for the passage of the screws 15, this supporting bracket 32 also possesses, in places in its central region, recesses 36 which are elongated circularly in the form of stud-holes and which, numbering three in the embodiment illustrated, are intended to promote good ventilation of the internal space of the clutch.

Finally, in the embodiment illustrated in FIGS. 1 to 3, this supporting bracket 32 has, on its outer periphery, a toothing which constitutes, in a manner known per se, a starter ring 37 which is in one piece with it.

In the embodiment illustrated in FIGS. 1 to 3, the reaction element 33 is a relatively bulky component made, for example, of cast iron and produced, for example, by moulding.

In practice, on either side of the friction disc 12, the reaction element 33 and the pressure plate 13, have substantially equivalent masses.

The cover 14 is fixed to the reaction element 33. The said reaction element 33 and the supporting bracket 32 with which it is associated bear axially on one another only by means of local seats 38, in such a way that the recesses 41 left free circumferentially between the said seats 38, between the said reaction element 33 and the said supporting bracket 32, open freely outwards radially.

In practice, in the embodiment illustrated in these FIGS. 1 to 3, the seats 38 thus interposed axially between the reaction element 33 and the supporting bracket 32 project axially on this reaction element 33; being in one piece with the latter, are each set individually in line with lugs 39 extending the said reaction element 33 radially on its outer periphery, are obliquely connected radially to the reaction element by stiffening ribs 40, and there are three of them appropriately distributed circularly around the axis of the assembly.

For reasons which will become apparent below, each lug 39, which the reaction element 33 thus possesses radially, projects circularly in one direction beyond the associated seat 38.

As a corollary to this, the fastening means fixing the two parts forming the reaction plate assembly 10 to one another, namely the supporting bracket 32 and the reaction element 33, preferably contribute at least partially to forming the fastening means which moreover fix the cover 14 to the said reaction plate assembly 10.

In the embodiment illustrated in FIGS. 1 to 3, the fastening means fixing this supporting bracket 32 and this reaction element 33 to one another consist, in practice, of screws 42 of which there are three in this embodiment and which are each individually set axially in line with the seats 38 interposed axially between the said reaction element 33 and the said supporting bracket 32.

Such a screw 42 bears by means of its head 43 on the corresponding portion 19' of the radial edge 19 of the cover 14, and by means of its shank 44 it passes axially not only through this portion 19' of the said radial edge 19 of the cover 14, but also through the corresponding seat 38 of the reaction element 33, before being engaged by screwing into a threaded perforation 45 correspondingly provided in the supporting bracket 32, FIG. 3.

As a complement to these screws 42 which are sufficient in themselves for fastening the reaction element 33 to the supporting bracket 32, the fastening means fixing the cover 14 to the reaction plate assembly 10 also incorporate, in the embodiment illustrated in FIG. 1 to 3, a plurality of rivets 47 which are located substantially on the same circumference as that on which the screws 42 are located, and which, numbering three in this embodiment, are each individually set axially between a portion 19' of the radial edge 19 of the cover 14 and the corresponding radial lug 39 of the reaction element 33 by means of the extension which such a lug has circularly in relation to the associated seat 38.

In practice, in the embodiment illustrated in FIGS. 1 to 3, these rivets 47 are utilised to ensure the fastening to the reaction element 33 and consequently to the reaction plate assembly 10 of elastically deformable tabs 50, conventionally provided to fix the pressure plate 13 in rotation to the cover 14 and consequently to the reaction plate assembly 10.

These elastically deformable tabs 50, which are paired in the embodiment illustrated, extend substantially at a tangent to a circumference of the assembly, and at their other end they are attached by rivets 51 to the radial lugs 23 of the pressure plate 13.

As will be noted, in the embodiment illustrated in FIGS. 1 to 3, the elastically deformable tabs 50 bear on the face of the radial edge 19 of the cover 14 which is turned in the direction away from the reaction plate assembly 10.

As a result, because they have to stress the pressure plate 13 permanently in the direction away from this reaction plate assembly 10, they have a camber in relation to which they are permanently subjected to compression so that they themselves thrust permanently against the pressure plate 13.

Moreover, and in a manner known per se, there is an ignition target 55 with a toothing 56.

In the embodiment illustrated in FIGS. 1 to 3, this ignition target 55 forms a separate component which is secured to the clutch by the fastening means fixing the cover 14 to the reaction plate assembly 10.

In practice, the separate component thus constituting this ignition target 55 incorporates axially an edge 57, on which its toothing 56 is formed, and transversely a collar 58 which is directed radially towards the axis of the assembly and by means of which it is secured to the said assembly both by the screws 42 and by the rivets 47, this radial collar 58 being inserted axially between the radial edge 19 of the cover 14 and the radial lugs 39 of the reaction element 33.

In practice, in the embodiment illustrated, the radial collar 58 of the ignition target 55 has in places, on its inner periphery, wide notches 59 which are the image of the portions 19' of the radial edge 19 of the cover 14 and which, forming radial lugs 60 between them, alternate circularly with the said portions 19', the said lugs 60 each being axially superimposed respectively on the said portions 19'.

Finally, in the embodiment illustrated in FIGS. 1 to 3, centering studs 62 are provided which extend from the radial edge 19 of the cover 14 to the supporting bracket 32 of the reaction plate assembly 10. In practice, there are three centering studs 62 which are each set axially in line with the seats 38 interposed axially between the reaction element 33 and the supporting bracket 32 of the reaction plate assembly 10.

As will be noted, because the cover 14 has a limited axial extension since it is fixed by means of the tabs 50 and the ignition target 55 to the reaction element 33, it does not mask the outward opening of the recesses 41 which the seats 38 form circumferentially between them, and therefore they advantageously ensure, during operation, and in interaction with the stiffening ribs 40 associated with the said seats 38, substantial ventilation of the internal space of the clutch, in addition to the recesses 36 in the supporting bracket 32 which could prove insufficient in this respect.

As will also be noted, the clutch herein described comprises a unit assembly which can be attached as such to the shaft 11 with which it is to be associated.

Figure 5:
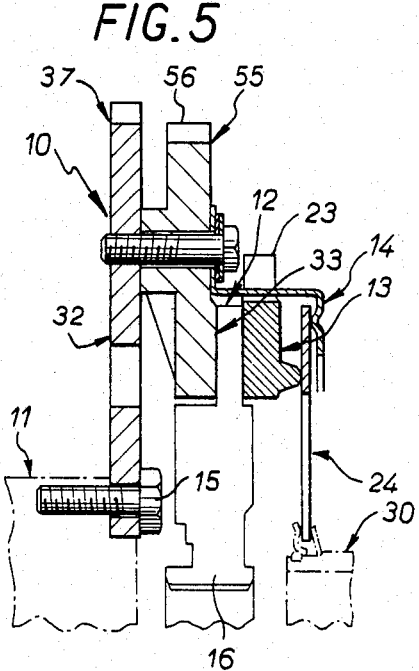
FIGS. 5 and 6 are half-views in axial section, substantially similar to that of FIG. 3 and relating to alternative embodiments.

In the alternative embodiment illustrated in FIG. 5, the ignition target 55 is integral with the reaction plate assembly 10, being in one piece with the reaction element 33.

As illustrated, the toothing 56 of this ignition target 55 can be formed directly on the edge of this reaction element 33, the latter being radially extended continuously for this purpose, and no longer merely in the form of lugs, as before.

Figure 6:
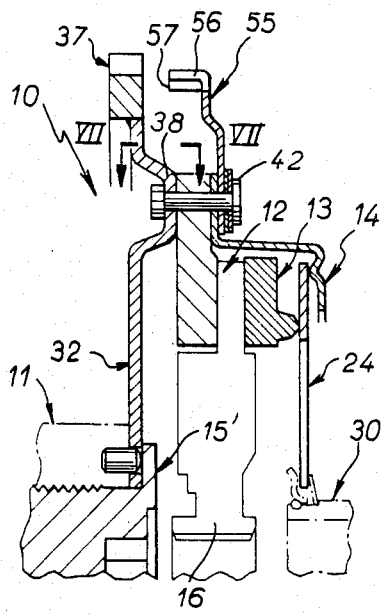
Figure 7:
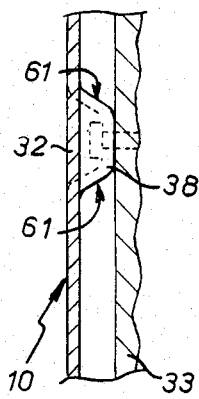
FIG. 7 is a partial view, assumed to be laid out flat, of the alternative embodiment illustrated in FIG. 6, of a circumferential section along the line VII—VII in FIG. 6.
Figure 8:
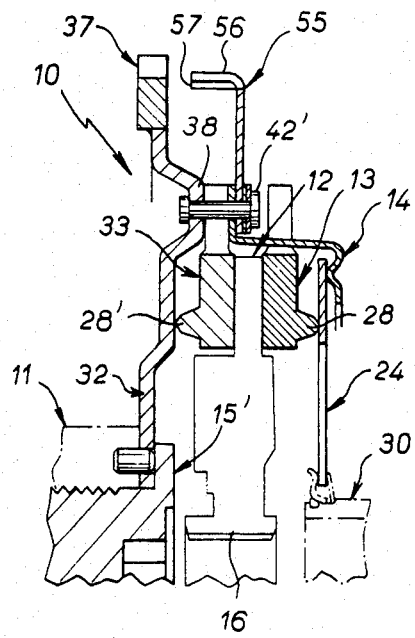
FIG. 8 is a half-view in axial section similar to that of FIG. 3 and relating to another alternative embodiment.

In the embodiments illustrated in FIGS. 6 to 8, the seats 38 interposed axially between the reaction element 33 and the supporting bracket 32 with which it is associated are formed on the said supporting bracket 32, whilst the reaction element is substantially flat.

In practice, in these embodiments, the supporting bracket 32 is a simple component made of suitably stamped sheet metal, and the seats 38 which project axially from it are bosses resulting from the corresponding die-casting.

In conjunction with this, the starter ring 37 is a component separate from this supporting bracket 32 and suitably attached, for example by welding, as illustrated, to the outer periphery of the latter.

Moreover, in the embodiments illustrated in FIGS. 6 to 8, the fastening means fixing the two parts forming the reaction plate assembly 10 to one another, namely the supporting bracket 32 and the reaction element 33, no longer consist of screws, as before, but of rivets 42'.

As before, these are set in line with the seats 38, and as before, the recesses 41 which these seats 38 form circumferentially between them open freely outwards radially.

In the embodiment illustrated in FIG. 8, the reaction element 33 forms a component identical to that formed by the pressure plate 13.

It therefore has axially an annular bead 28' by means of which it bears axially on the supporting bracket 32.

Thus, in addition to an advantageous reduction in the number of different components required, the pressure plate 13 and the reaction element 33 advantageously have similar thermal inertias.

For the purpose of good circulation of air, the annular bead 28' of this reaction element 33 is fragmented circularly, and the same is therefore true in the case of the annular bead 28 of the pressure plate 13, this being, moreover, the case most frequently encountered in practice.

As will also be noted, the pressure plate 13 and the reaction element 33 advantageously benefit from similar ventilation conditions.

Furthermore, in the embodiments illustrated in FIGS. 6 to 8, instead of being attached to the shaft 11 by a plurality of screws 15, the reaction plate assembly 10 and consequently the clutch as a whole is attached to this shaft 11 by a single screw 15' provided axially, according to arrangements which will not be described in any more detail here.

Finally, in the embodiments illustrated in FIGS. 6 to 8, the toothing 56 of the ignition target 55, instead of being formed by suitable deformation at the axial edge 57 of the latter, is formed by the appropriate cutting-out of this axial edge 57.

In an embodiment not illustrated, and in the manner of the ignition target 55, the starter ring 37 forms a separate component secured to the assembly by the fastening means fixing the cover 14 to the reaction plate assembly 10 and, more precisely, to the reaction element 33.

The field of application of the invention is not limited to that of smiple clutches comprising only one pressure plate and only one friction disc, but extends equally to that of multiple clutches comprising several pressure plates and several friction discs, and especially to that of double clutches.

We claim:

1. A dry friction clutch comprising, in axial succession, a reaction plate assembly adapted to be fixed for rotation with a first shaft and a friction disc adapted to be fixed for rotation with a second shaft, a pressure plate fixed for rotation with said reaction plate assembly and movable axially in relation thereto, a cover, fastening means fixing said cover to said reaction plate assembly, and elastic means bearing on said cover for urging said pressure plate towards said reaction plate assembly for clamping said friction disc axially between said pressure plate and said reaction plate assembly, said reaction plate assembly comprising two separate parts, fixing means fixing said parts to each other, one of said parts comprising a transverse supporting bracket adapted to be fixed to the first shaft and the other of said parts comprising a reaction element cooperable with said friction disc, said fastening means fixing said cover to said reaction element, and said reaction element and said supporting bracket bearing axially against each other by means of discrete axial projections formed in one piece with a selected one of said supporting bracket and said reaction plate element, curcumferential recesses between said axial projections and between said reaction element and said supporting bracket communicating with the interior of said clutch for ventilating said clutch and said axial projections being located in line with lugs extending radially from the periphery of said reaction element.

2. A clutch according to claim 1, in which said fixing means fixing said two parts of said reaction plate assembly at least in part define said fastening means fixing said cover to said reaction plate assembly, and wherein said fixing means and said fastening means are arranged in line with said axial projections.

3. A clutch according to claim 1, wherein said axial projections are formed in one piece with said supporting bracket.

4. A clutch according to claim 1, wherein said supporting bracket is a stamped sheet metal component.

5. A clutch according to claim 3, wherein said supporting bracket is a stamped sheet metal component, and said axial projections are defined by bosses on said supporting bracket.

6. A clutch according to claim 1, further comprising a separate ignition marker fixed by said fastening means.

7. A dry friction clutch comprising, in axial succession, a reaction plate assembly adapted to be fixed for rotation with a first shaft and a friction disc adapted to be fixed for rotation with a second shaft, a pressure plate fixed for rotation with said reaction plate assembly and movable axially in relation thereto, a cover, fastening means fixing said cover to said reaction plate assembly, and elastic means bearing on said cover for urging said pressure plate towards said reaction plate assembly for clamping said friction disc axially between said pressure plate and said reaction plate assembly, said reaction plate assembly comprising two separate parts, fixing means fixing said parts to each other, one of said parts comprising a transverse supporting bracket adapted to be fixed to the first shaft and the other of said parts comprising a reaction element cooperable with said friction disc, said fastening means fixing said cover to said reaction element, and said reaction element and said supporting bracket bearing axailly against each other by means of discrete axial projections formed in one piece with a selected one of said supporting bracket and said reaction plate element, circumferential recesses between said axial projections and between said reaction element and said supporting bracket communicating with the interior of said clutch for ventilating said clutch and, said reaction element being a component identical to that of said pressure plate.

* * * * *